(12) United States Patent
Biel et al.

(10) Patent No.: US 8,474,653 B2
(45) Date of Patent: Jul. 2, 2013

(54) METHOD AND DEVICE FOR SINGULATING OPHTHALMIC LENSES

(75) Inventors: Roger Biel, Aschaffenburg (DE); Peter Hagmann, Erlenbach am Main (DE); Günter Lässig, Obernburg (DE)

(73) Assignee: Novartis AG, Basel (CH)

( * ) Notice: Subject to any disclaimer, the term of this patent is extended or adjusted under 35 U.S.C. 154(b) by 41 days.

(21) Appl. No.: 12/849,518

(22) Filed: Aug. 3, 2010

(65) Prior Publication Data

US 2010/0316476 A1  Dec. 16, 2010

Related U.S. Application Data

(62) Division of application No. 11/821,948, filed on Jun. 26, 2007, now Pat. No. 7,789,266.

(30) Foreign Application Priority Data

Jun. 26, 2006  (EP) .................................... 06013094

(51) Int. Cl.
B23Q 7/04 (2006.01)
(52) U.S. Cl.
USPC ............................ 221/211; 206/5.1; 414/797

(58) Field of Classification Search
USPC ......... 414/755, 797, 795.6; 221/211; 206/5.1; 209/576; 294/183, 185
See application file for complete search history.

(56) References Cited

U.S. PATENT DOCUMENTS

| 4,181,241 A * | 1/1980 | Currah | ......................... 221/211 |
| 6,260,695 B1 * | 7/2001 | Tasber et al. | .................. 206/5.1 |

FOREIGN PATENT DOCUMENTS

| EP | 0 278 852 | 8/1988 |
| EP | 1 490 209 | 1/2006 |

OTHER PUBLICATIONS

English Translation of Chinese Office Action for Application No. 200780023506.2 dated Dec. 13, 2010.
PCT International Search Report. Sep. 20, 2007.
PCT Written Opinion of the International Searching Authority, Sep. 20, 2007.

* cited by examiner

*Primary Examiner* — Saul Rodriguez
*Assistant Examiner* — Willie Berry, Jr.
(74) *Attorney, Agent, or Firm* — Sheng-Hsin Hu

(57) ABSTRACT

The present invention relates to a method and a device for singulating ophthalmic lenses, particularly contact lenses. The method and the device are suitable for integration into an automated production of ophthalmic lenses, particularly contact lenses.

11 Claims, 5 Drawing Sheets

METHOD AND DEVICE FOR SINGULATING OPHTHALMIC LENSES

This application is a division of U.S. patent application Ser. No. 11/821,948, filed Jun. 26, 2007 now U.S. Pat. No. 7,789,266, which claims benefit under 35 USC §119 of European patent application No. EP 06013094.5 file Jun. 26, 2006, the contents of which are incorporated herein by reference in its entirety.

The present invention relates to a method and a device for singulating ophthalmic lenses, particularly contact lenses. The method and the device are suitable for integration into an automated production of ophthalmic lenses, particularly contact lenses.

In the known methods for producing ophthalmic lenses, particularly contact lenses, the individual lenses are transported through the production process in each case in separate positions on a production tool or on separate carriers.

A preferred method for producing ophthalmic lenses, particularly contact lenses, is the photochemical polymerization or crosslinking of suitable prepolymers in casting moulds. These casting moulds are either plastic casting moulds (preferably polypropylene (PP) or polyethylene (PE), but also polycarbonate (PC) and polyethyleneterephthalate (PET)) for one-off use, or glass and/or quartz casting moulds for multiple use. Preferred polymers, resulting from the photochemical polymerization of suitable prepolymers, are polymers based on polyvinyl alcohols (PVA) or silicone hydrogels, but also those based on polyethylene glycols (PEG).

In the known methods, the casting moulds are guided as such, or alternatively on suitable tool carriers, through the production process. Each transfer in this production process takes place from one defined position to another defined position relative to the respective lens.

In an automated process, this set-up necessarily requires that the process be managed cyclically. Considerable outlay is required for time separation or for spatial separation of individual production steps. Time separation (i.e. in the production process between different production steps, but within the same production line) requires large storage areas or a high level of logistics. Spatial separation (i.e. in the production process between different production steps and/or between different production lines) requires the transport and storage of many separate lenses in their respective containers.

The complex methods for producing ophthalmic lenses increasingly require highly specialized production devices. It is therefore desirable in many cases to spatially separate the production steps, in order thereby to make the investments for highly specialized production devices just once or at just one site and to correspondingly charge the production devices with intermediate products from several sites. Moreover, it is also desirable for the production steps to be easily separated in terms of time, in order thereby to increase the flexibility of the production method for producing different lenses.

It is known that ophthalmic lenses, particularly contact lenses, can be tightly stacked in large quantities in a storage liquid in a suitable container. For example, several hundred ophthalmic lenses can be stacked in a storage liquid, for example water, in a test tube (with a diameter of approximately 15 mm and a length of approximately 10 cm).

A problem that arises is that of singulating the stacked ophthalmic lenses from this high-density buffer after transport or storage. A high-density buffer within the meaning of this description is a suitable container in which several contact lenses are stacked very tightly in a storage liquid. Suitable storage liquids according to this description are water, water containing one or more disinfecting ingredients, salt solutions or buffered solutions, for example saline.

EP 1490209 B1 discloses, among other things, a gripper, comprising a gripper head which has an attachment surface for a contact lens and in which there are one or more openings through which an underpressure can be applied in order to suck the contact lens onto the attachment surface, and through which an overpressure can be applied in order to release the contact lens from the attachment surface. The gripper head includes channels that connect several openings to one another. Through the connection of several (or even all) of the openings with the aid of the channels provided in the gripper head, it is on the one hand possible to achieve a reliable suctioning of the contact lens onto the attachment surface when an underpressure is applied, since the contact lens is suctioned onto the attachment surface at several sites simultaneously, and, on the other hand, it is possible, for the same reason, for the contact lens to be reliably and specifically placed into a container when an overpressure is applied.

U.S. Pat. No. 6,143,210 discloses a further vacuum gripper design for pick and place operations in the manufacture of contact lenses. Said vacuum gripper (FIG. 7 of U.S. Pat. No. 6,143,210) comprises a nozzle element (71) with a body portion (72) and a head portion (73), a vacuum source (81) connected to a central passage (82) extending through the body portion and connected with a nozzle head passage (83), which forms an opening (75) in the nozzle head surface (74). Said gripper is particularly designed to releasing a contact lens from the mold section in which it was molded.

Grippers known from the prior art (e.g. EP 0 969 956 B1, EP 1 490 209 B1, U.S. Pat. No. 6,143,210) are able to grip several ophthalmic lenses at a time from a high-density buffer, but only in an unspecific manner, i.e. one or more ophthalmic lenses at a time. This therefore results in the technical problem of singulating the ophthalmic lenses after the unspecific gripping of one or more ophthalmic lenses by means of a conventional gripper.

U.S. Pat. No. 4,181,241 discloses a device for singulating seeds (12), wherein by means of a vacuum gripper (21) individual seeds (12) can be removed from a vessel (11) comprising a suspension of seeds in water, wherein a turbulent flow is generated by rotation of a paddle agitator. The capture orifice (55) of the probe (52) has a dimension of from 40% to 200% of a seed diameter (as disclosed in the example in Col. 8, 1. 62-65).

It has now been found that a device comprising a liquid-filled vessel with a turbulent flow and a specifically adapted vacuum gripper is suitable for separating one or more ophthalmic lenses from one another, such that these lenses can be removed singly from the turbulent flow in this vessel by means of said vacuum gripper.

DESCRIPTION OF THE DRAWINGS

FIG. 1 is a schematic representation of a container 1 in which several contact lenses 2 are stacked very tightly in a storage liquid. FIG. 2 is a schematic representation of a liquid-filled vessel 3 which contains several contact lenses 2 and in which there is a turbulent flow.

FIG. 3a and FIG. 3b show two views of a vacuum gripper for singulating contact lenses from a turbulent flow. FIG. 3a is a side view (cross section), while FIG. 3b is an enlarged view of the vacuum gripper from below. The vacuum gripper 4 has a suction surface 5 which, in the embodiment shown, has four holes.

FIG. 4 shows a preferred embodiment of a vessel 3 with a turbulent flow in the liquid chamber 9. Liquid is delivered through an admission line 10 into an annular conduit 6 and can then flow through admission openings 7 (designed as nozzles in a particularly preferred embodiment) into the vessel 3. The liquid chamber 9 also comprises through-openings 8 (the vessel 3 in a particularly preferred embodiment being designed as a sieve in one area) through which liquid can flow into an outlet line 11.

FIG. 5 shows a particularly preferred embodiment of a vessel 3 with a turbulent flow in the liquid chamber 9. Liquid is delivered through an admission line 10 into an annular conduit 6 and can then flow through admission openings 7 (designed as nozzles in a particularly preferred embodiment) into the vessel 3. The liquid chamber 9 also comprises through-openings 8 (the vessel 3 in a particularly preferred embodiment being designed as a sieve in one area) through which liquid can flow into an outlet line 11. Moreover, a container 1, in which several contact lenses 2 are tightly stacked in a storage liquid, is connected from underneath to the vessel 3. By means of an upward movement of the piston 12, the contact lenses 2 are gradually pressed into the liquid chamber 9, where they are taken up by the turbulent flow and can be singulated.

FIG. 6 shows a test device for singulating contact lenses from a high-density buffer by means of a liquid-filled vessel according to the invention, with a turbulent flow, and by means of a suitable vacuum gripper. In a first step, one or more contact lenses are gripped, at point A, by a conventional gripper (or, in a simplified test set-up, by a vacuum gripper with small suction surface) and are placed, at point B, into the vessel with the turbulent flow. After a short dwell time (at least 1 second, preferably 5 to 10 seconds), a vacuum gripper with small suction surface is driven, in a subsequent step, from point C to point D through the vessel with the turbulent flow in order to grip a contact lens. The first contact lens gripped closes the small suction surface of the gripper in such a way that no further contact lens is gripped in this step. The vacuum gripper then transports the gripped contact lens to point E and places it there into a further vessel. The vacuum gripper returns several times to point C and carries out steps C to E until there is no further lens to be gripped in the vessel with the turbulent flow. In the simplified test set-up shown here, the same vacuum gripper with small suction surface then returns to point A in order to singulate the next one or more lenses (see above steps starting from point A).

The device according to the invention and the method according to the invention for singulating ophthalmic lenses, preferably contact lenses, are set forth in the claims.

The device according to the invention preferably comprises a vessel 3 with one or more admission openings 7 that are designed to generate a turbulent flow in the vessel, and a vacuum gripper by means of which individual contact lenses 2 can be removed from the vessel.

Figure 1:
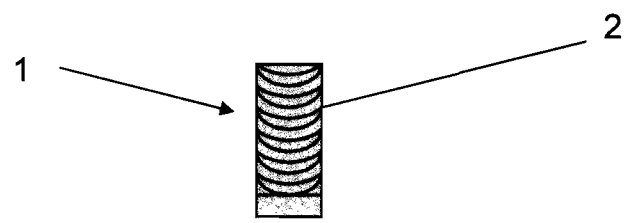
FIG. 1 shows a schematic representation of a high-density buffer.
Figure 2:
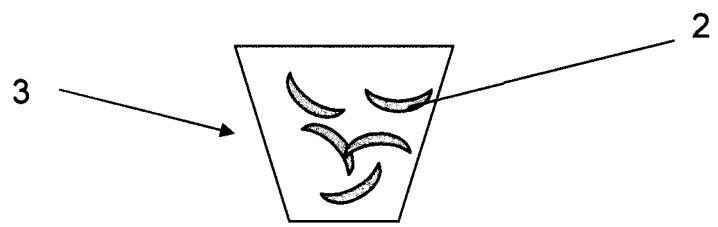
FIG. 2 shows a schematic representation of a liquid-filled vessel according to the invention, which contains several contact lenses and in which there is a turbulent flow.
Figure 3A:
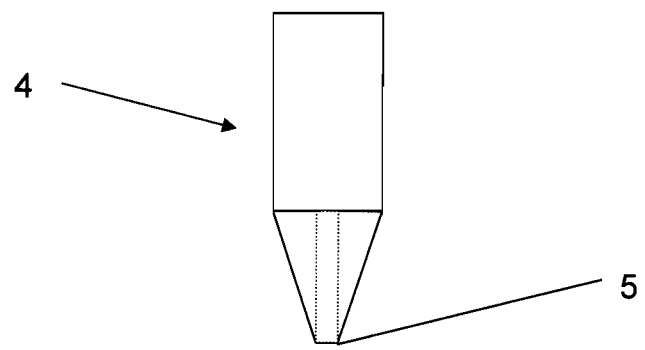
FIG. 3a and FIG. 3b show schematic representations of a vacuum gripper according to the invention for singulating contact lenses from the turbulent flow.
Figure 3B:
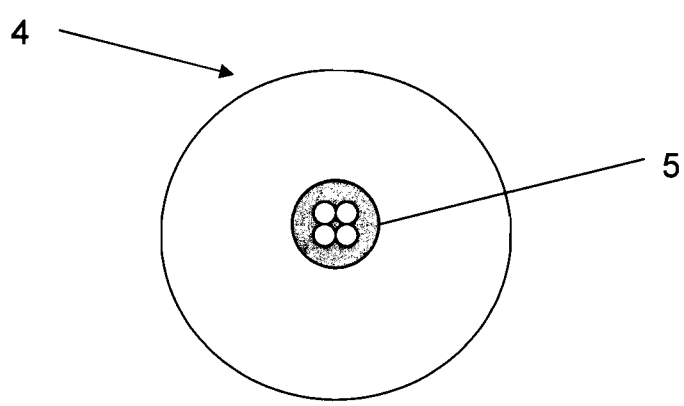

The vacuum gripper 4 is designed in such a way that the suction surface 5 is small. A small suction surface is particularly preferred that has one or more holes, and a small suction surface with one hole is very particularly preferred. The suction surface of the vacuum gripper is small, such that the first contact lens 2 that is gripped closes the suction surface 5 in such a way that no further contact lens is gripped in this step. "Small" designates a suction surface that has a diameter of 10% or less, preferably of 5% or less, particularly preferably of 1% or less, of the diameter of the lens that is to be gripped. For a contact lens diameter of 15 mm, a suction surface with a diameter of 0.5 to 1.5 mm is preferred. Suction surface designates the gripper's active surface whose diameter is defined by the farthest remote areas with suction action. In the case of a suction surface with one hole, the diameter of the suction surface corresponds to the diameter of the hole. In the case of a suction surface with several holes, the diameter of the suction surface corresponds to the diameter of a circle enclosing all the holes (see FIG. 3b).

Conventional grippers are mainly grippers with a large suction surface. From a vessel containing several contact lenses, between 1 and 10 lenses are gripped in one step with the aid of such a gripper. "Large" designates a suction surface that has a diameter of 20% or greater, preferably of 50% or greater, particularly preferably of 80% or greater, relative to the diameter of the lens that is to be gripped. The large suction surface of a conventional gripper has the effect that the first contact lens gripped does not close the suction surface, with the result that, from a vessel containing several contact lenses, more than one contact lens is gripped in one step.

A vessel shape with the fewest possible (or no) dead spaces is particularly preferred, in particular a funnel-shaped vessel. One or more outflows or overflows can be assigned to the one or more admission openings, such that replacement of the liquid in the vessel is possible. In a particularly preferred embodiment, the one or more admission openings are designed as nozzles. The one or more outflows or overflows are designed in the form of one or more individual through-openings, or, in a particularly preferred embodiment, the vessel is designed at least in one area as a sieve.

The through-openings in the vessel wall (or the part of the vessel designed as a sieve) are designed such that not all of the through-openings can be closed at the same time by a lens. This is achieved either by the number or the spatial arrangement of the through-openings. The through-openings can be made so small that a lens cannot escape through these through-openings. The through-openings have a diameter of less than 2 mm, preferably of less than 1 mm, and particularly preferably of less than 0.5 mm. The smaller the through-openings, the greater the number of these through-openings that have to be arranged in the vessel wall in order to ensure a sufficient throughput of the liquid. At least part of the vessel wall is preferably designed as a sieve, particularly preferably up to 50% of the vessel wall. The part of the vessel wall designed as a sieve is preferably the lower part of the vessel.

Moreover, the vessel is configured with a turbulent flow, in such a way that one or more lenses can be placed in it by means of a conventional gripper or by means of a vacuum gripper with a small suction surface.

Suitable conventional grippers are pincer-type grippers or vacuum grippers, for example grippers with a large suction surface. Large designates a suction surface that has a diameter of 20% or greater, preferably of 50% or greater, particularly preferably of 80% or greater, relative to the diameter of the lens that is to be gripped. However, other grippers in the form of a net or a sieve ladle are also conceivable.

In an alternative preferred embodiment, a high-density buffer containing several stacked lenses is connected to the vessel from underneath. The high-density buffer furthermore comprises a piston which is located under the stacked lenses and by means of which one or more lenses can be introduced from underneath into the vessel with the turbulent flow via an upward movement of the piston.

In another preferred embodiment, the vessel is equipped with a spray device which allows the lens on the gripper to be flushed off into the vessel. The spray device can be designed in the form of one or more admission openings arranged at or over the edge of the vessel, preferably in the form of one or more nozzles, particularly preferably as a ring of nozzles at the edge of the vessel. The spray device is suitable in particular for flushing the lens from the gripper into the vessel, e.g. in cases where placement in the vessel is made difficult by surface forces.

The device according to the invention is suitable for integration into an automated production device for ophthalmic lenses, in particular for contact lenses.

The invention further relates to a method for singulating ophthalmic lenses, characterized by separating several lenses in a vessel by means of turbulent flow and removing individual lenses from the vessel by means of a vacuum gripper with a small suction surface. The turbulent flow in the vessel is preferably generated by means of one or more admission openings (preferably in the form of one or more nozzles). The individual lenses are removed, by means of a vacuum gripper with a small suction surface, from the turbulent flow.

In a preferred embodiment of the method, one or more lenses are initially placed into the vessel with the turbulent flow by means of a conventional gripper or by means of a vacuum gripper with a small suction surface, which lenses are then separated by means of the turbulent flow and are removed individually from the vessel by means of a vacuum gripper with a small suction surface.

In another preferred embodiment of the method, one or more lenses are initially transferred into the vessel with the turbulent flow by means of a conventional gripper or by means of a vacuum gripper with a small suction surface, which lenses are then flushed off from the gripper and into the vessel by means of a spray device. The one or more lenses are then separated by means of the turbulent flow and are removed individually from the vessel by means of a vacuum gripper with a small suction surface.

In a particularly preferred embodiment of the method, one or more lenses are removed from a high-density buffer containing several stacked lenses, by means of a conventional gripper or by means of a vacuum gripper with a small suction surface, and are placed into the vessel with the turbulent flow, are separated by means of the turbulent flow and are removed individually from the vessel by means of a vacuum gripper with a small suction surface.

In another particularly preferred embodiment of the method, one or more lenses are removed from a high-density buffer containing several stacked lenses, by means of a conventional gripper or by means of a vacuum gripper with a small suction surface, are transferred into the vessel with the turbulent flow, are flushed off from the gripper and into the vessel by means of a spray device, are separated by means of the turbulent flow and are removed individually from the vessel by means of a vacuum gripper with a small suction surface.

In another particularly preferred embodiment of the method, one or more lenses from a high-density buffer, containing several stacked lenses and connected from underneath to the vessel, are introduced into the vessel with the turbulent flow by means of the upward movement of a piston under the lenses, are separated there by means of the turbulent flow and are removed individually from the vessel by means of a vacuum gripper with a small suction surface.

The dwell time of the lenses in the vessel prior to separation is 1 to 10 seconds, preferably 2 to 8 seconds, particularly preferably 5 seconds. However, the dwell time can also be considerably longer, depending on the requirements of the method.

The removal of the lens from the vessel is effected by the lens being sucked by underpressure onto the attachment surface of the vacuum gripper, and it corresponds in principle to the mode of operation of conventional vacuum grippers. The removal from the vessel takes place either from the liquid, or from the vessel when emptied or partially emptied of liquid, preferably from the liquid.

The tip of the vacuum gripper is either held stationary in the turbulent flow or, in a preferred embodiment, is moved along by the turbulent flow. The movement through the turbulent flow preferably takes place along a path starting at a point near one edge of the vessel, through the middle of the vessel, to a point near the other edge of the vessel. The first point particularly preferably corresponds to the immersion point of the vacuum gripper. If the vacuum gripper is held stationary in the turbulent flow, this is preferably not done in the middle of the vessel, but particularly preferably at a point between the edge of the vessel and the middle of the vessel. The immersion depth of the tip of the vacuum gripper depends on the shape and dimensions of the vessel, on the turbulent flow conditions and on the design of the vacuum gripper, in particular of the tip of the vacuum gripper. The depth of immersion is preferably slight, i.e. the lens is sucked up near the surface of the liquid.

Suitable liquids in the vessel with the turbulent flow are water, water containing one or more disinfecting ingredients, salt solutions or buffered solutions, for example saline, and organic solvents, for example ethanol.

EXAMPLES

In a laboratory test, contact lenses that were produced in a conventional automated production method were placed by means of conventional grippers into a test tube. In a test tube with a diameter of approximately 15 mm and a length of approximately 10 cm, 500 contact lenses were stacked in a storage liquid (water).

Figure 4:
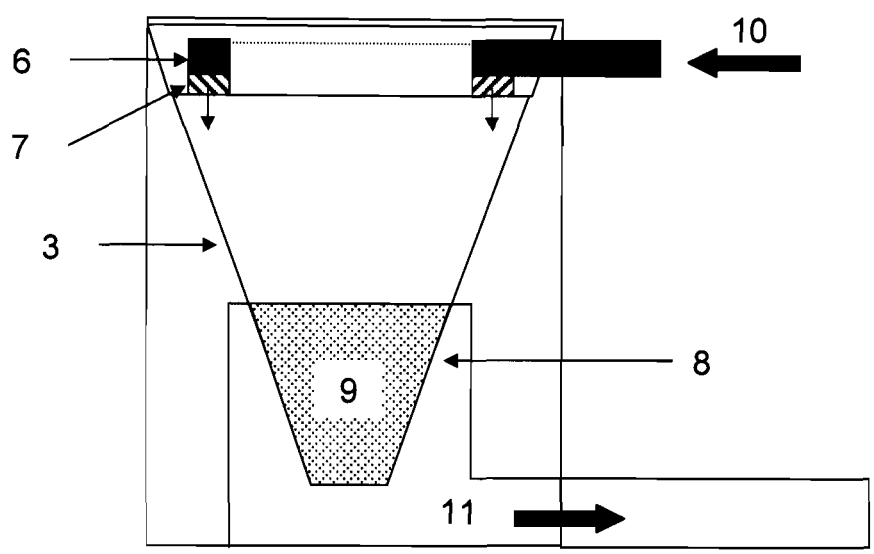
FIG. 4 shows a vessel with a spray device according to a preferred embodiment of the invention.
Figure 5:
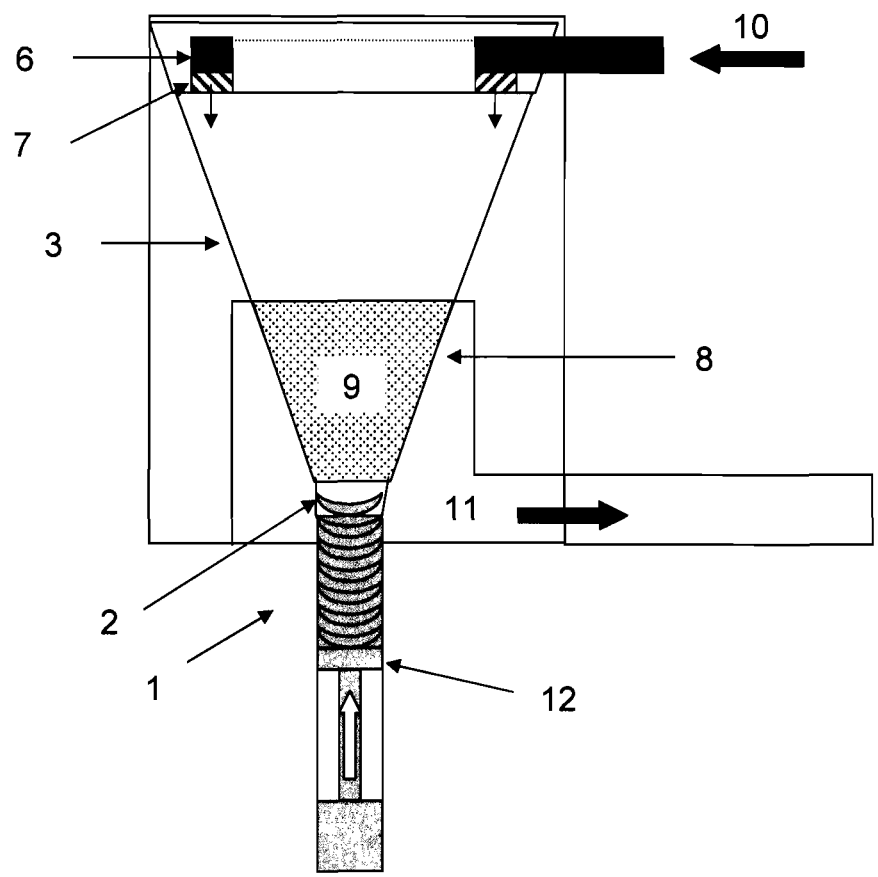
FIG. 5 shows a vessel with a spray device and a system for delivery of contact lenses from below, according to a particularly preferred embodiment of the invention.
Figure 6:
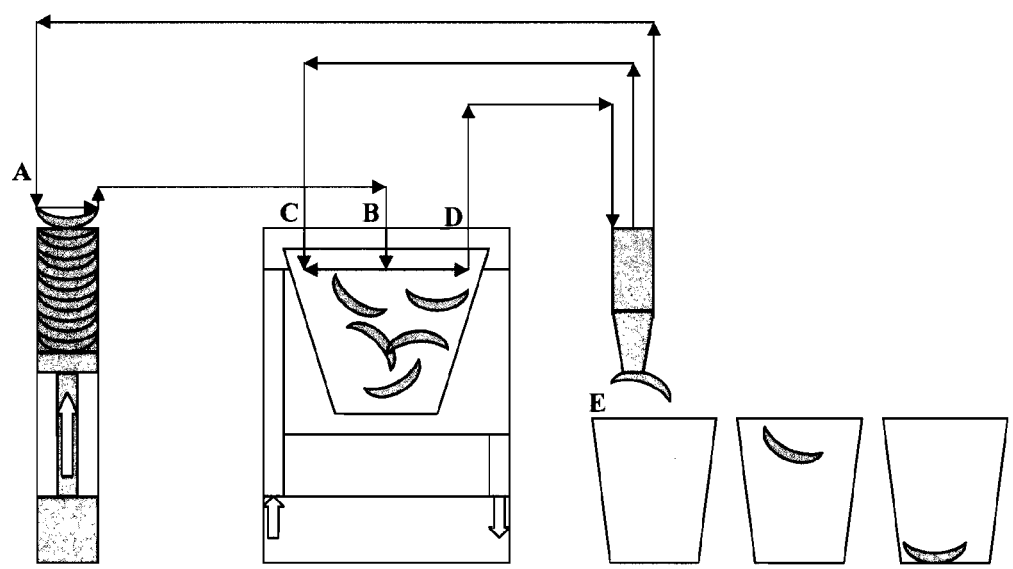
FIG. 6 shows a test arrangement for singulating contact lenses from a high-density buffer by means of a liquid-filled vessel according to the invention which contains several contact lenses and in which there is a turbulent flow, and by means of a suitable vacuum gripper.

The laboratory test was conducted with the test device according to FIG. 6, and, for singulation, a funnel-shaped vessel according to FIG. 4 was used into which water was delivered by means of several nozzles (diameter 0.8 mm) arranged in a ring formation at the upper edge of the vessel and in which a turbulent flow was thus generated. The funnel-shaped vessel had a height of 5 cm and a maximum diameter of 4 cm. The vessel was filled with water to at least ⅔ of its height. The vessel was furthermore designed with through-openings which extended to ½ its height and through which water was delivered. The flow throughput in the laboratory test was between 0.9 and 1.1 l/min.

In a first step, between 1 and 10 lenses were introduced into the funnel-shaped vessel with the aid of a vacuum gripper. After a short dwell time (5 to 10 seconds) in the turbulent flow, one individual lens at a time was removed from the turbulent flow with the aid of a vacuum gripper (with three suction holes, each with a diameter of 0.8 mm, corresponding to a diameter of the suction surface of 1.5 mm) and transferred into a separate packaging container (one container per lens). This step was repeated until there was no lens left to grip. Thereafter, a further 1 to 10 lenses were introduced into the funnel-shaped vessel with the aid of a vacuum gripper.

The packaging containers were finally checked for the presence of a lens using conventional automated methods. In a test run of over 500 lenses, there was not a single instance of the vacuum gripper failing to remove a lens, or removing more than one lens, from the turbulent flow for placement into a packaging container.

The invention claimed is:

1. A device for singulating ophthalmic lenses comprising:
    a high-density buffer containing several stacked lenses in a storage liquid;
    a vessel with an admission line having an annular conduit, wherein the annular conduit having one or more nozzles to separate ophthalmic lenses from the high-density buffer,
    wherein the nozzles are designed to generate a turbulent flow in the vessel,
    a vacuum gripper for gripping one or more ophthalmic lenses from the high-density buffer and placing the one or more ophthalmic lenses into the vessel with the turbulent flow, and
    wherein the vacuum gripper is designed in such a way that the suction surface has a diameter of 10% or less of the diameter of the ophthalmic lens that is to be gripped.

2. The device according to claim 1, characterized in that the vacuum gripper has a small suction surface with one or more holes.

3. The device according to claim 2, characterized in that the vessel is configured in such a way that one or more ophthalmic lenses can be placed in it by means of a conventional gripper with a small suction surface.

4. The device according to claim 2, characterized in that the vessel comprises, as the admission openings, a spray device in the form of one or more nozzles arranged at or over the edge of the vessel.

5. The device according to claim 2, characterized in that the vessel is configured in such a way that one or more ophthalmic lenses can be placed in it by means of a vacuum gripper with a small suction surface.

6. The device according to claim 1, characterized in that the vessel is funnel-shaped and is designed at least in one area as a sieve.

7. The device according to claim 1, characterized in that the high-density buffer comprising a piston is connected to the vessel from underneath, by means of which piston one or more ophthalmic lenses can be introduced from underneath into the vessel with the turbulent flow.

8. The device according to claim 1, wherein the suction surface has a diameter of 5% or less of the diameter of the ophthalmic lens that is to be gripped.

9. The device according to claim 1, characterized in that the vacuum gripper has a small suction surface with one or more holes, preferably a small suction surface with one hole.

10. The device according to claim 9 characterized in that the vessel is funnel-shaped and is designed at least in one area as a sieve.

11. The device according to claim 9, characterized in that the vessel is configured in such a way that one or more ophthalmic lenses can be placed in it by means of a conventional gripper with a small suction surface.

* * * * *